United States Patent
Ahlfors et al.

(10) Patent No.: US 6,977,940 B1
(45) Date of Patent: Dec. 20, 2005

(54) METHOD AND ARRANGEMENT FOR MANAGING PACKET QUEUES IN SWITCHES

(75) Inventors: Ulf Ahlfors, Kävlinge (SE); Anders Fyhn, Malmö (SE); Peter Tufvesson, Lund (SE)

(73) Assignee: Switchcore, AB, Lund (SE)

( * ) Notice: Subject to any disclaimer, the term of this patent is extended or adjusted under 35 U.S.C. 154(b) by 0 days.

(21) Appl. No.: 09/560,105

(22) Filed: Apr. 28, 2000

(51) Int. Cl.[7] .......................... H04L 12/28; H04L 12/56
(52) U.S. Cl. ........................ 370/412; 370/417
(58) Field of Search ................ 370/395.7, 395.71, 370/395.72, 412, 415, 416, 417, 428, 429

(56) References Cited

U.S. PATENT DOCUMENTS

| | | | |
|---|---|---|---|
| 5,583,500 A | * 12/1996 | Allen et al. | 341/107 |
| 5,805,589 A | 9/1998 | Hochschild et al. | 370/389 |
| 5,862,128 A | 1/1999 | Cooperman et al. | 370/236 |
| 5,920,561 A | * 7/1999 | Daniel et al. | 370/395.6 |
| 6,188,690 B1 | * 2/2001 | Holden et al. | 370/390 |
| 6,226,267 B1 | * 5/2001 | Spinney et al. | 370/235 |
| 6,335,932 B2 | * 1/2002 | Kadambi et al. | 370/391 |
| 6,396,834 B1 | * 5/2002 | Bonomi et al. | 370/394 |
| 6,426,943 B1 | * 7/2002 | Spinney et al. | 370/235 |
| 6,430,184 B1 | * 8/2002 | Robins et al. | 370/392 |
| 6,430,187 B1 | * 8/2002 | Park | 370/397 |
| 6,480,499 B1 | * 11/2002 | Richards et al. | 370/412 |
| 6,560,229 B1 | * 5/2003 | Kadambi et al. | 370/392 |
| 6,636,518 B1 | * 10/2003 | Liencres | 370/395.7 |
| 6,661,801 B1 | * 12/2003 | Richards et al. | 370/412 |

FOREIGN PATENT DOCUMENTS

| | | | |
|---|---|---|---|
| EP | 0 729 104 A2 | 8/1996 | G06F/13/18 |
| JP | 55-008910 | 1/1980 | G06K/15/00 |
| JP | 57-214369 | 12/1982 | G06F/6/59 |
| JP | 01-141809 | 6/1989 | G06F/15/82 |
| JP | 01-238130 | 9/1989 | G06F/15/82 |
| JP | 02-164988 | 6/1990 | G06F/3/12 |
| JP | 08022983 | 1/1996 | G06F/3/12 |
| JP | 09160715 | 6/1997 | H04L/12/28 |
| SU | 491980 A | 2/1976 | G11B/5/02 |

* cited by examiner

*Primary Examiner*—Wellington Chin
*Assistant Examiner*—Jamal A. Fox
(74) *Attorney, Agent, or Firm*—Pillsbury Winthrop LLP

(57) ABSTRACT

The invention relates to a method and means for managing packet queues in switches. The switch has a shared memory split in a small internal memory and a large external memory. There is limited bandwidth to the external memory. The method comprises the steps of dividing a data stream incoming on the input ports intended for respective output ports into two parts, of which the first part is to be sent to an internal queue belonging to at least one output port and the second part is to be sent to the external memory. The incoming data stream may be identified as belonging to flow groups and the division of the data stream is then performed e.g. such that flow groups with a higher priority than a division threshold are sent to said internal queues in the first part, while flow groups with priority lower than said threshold are sent to the external memory in the second part.

48 Claims, 1 Drawing Sheet

METHOD AND ARRANGEMENT FOR MANAGING PACKET QUEUES IN SWITCHES

FIELD OF THE INVENTION

The present invention relates to a method and an arrangement for managing packet queues in switches. The switch has a shared memory split in a small internal memory and a large external memory. There is limited bandwidth to the external memory. Generally, the switch is used to send data packets from input ports to output ports. The data rate of the output link connected to the output port may be lower than the data rate of the incoming data stream. There may be various reasons for this, e.g. if several input ports are sending packets to the same output port, collisions or pause messages to the output port. The present invention provides a method and an arrangement for managing internal queues in a switch and split the incoming data stream between the internal memory and external memory. The invention also monitors and identifies when and which flows should be diverted through the external memory or integrated back into the internal memory.

BACKGROUND

It is previously known to divide data streams for various reasons. In the Japanese published document number JP 59-103147, an A/D converter is shown having two parallel buffers. Data given from the A/D converter is divided to be stored alternately in one of the buffers depending on a occupancy of the buffer. The Japanese published document number JP 11-008631 shows an ATM cell transmission flow control system having a divided buffer. The Japanese published document number JP 03-100783 shows a queue buffer system including a queue buffer and an external memory. When the queue buffer is filled up with tokens, tokens overflowing the queue buffer are written in the external memory.

Thus, there is a need for a queue management system in packet switches enabling the internal memory and queues to co-operate with the external memory, without unnecessary blocking output ports serving well-behaved traffic. The amount of data sent through the external memory should as be as small as possible. The invention solves the problem by dividing the incoming data stream intended for one output port into one part corresponding to the capacity of the output port and a second part to be sent to the external memory. The division of the data stream is performed on a priority and/or flow group basis. Also, data is integrated back to the internal memory such that the packets are not reordered within separate data flows.

SUMMARY OF THE INVENTION

The invention provides a method of managing packet queues in a switch having a limited primary memory including a number of queues for switching data packets between input ports and output ports, and connected to a larger secondary memory also including a number of queues. The method comprises the steps of dividing a data stream incoming on the input ports intended for respective output ports into two parts, of which the first part contain flows to be sent to an output port queue of the primary memory and the second part contain flows to be sent to the secondary memory.

The division of the data stream may be performed, so that the total load of the flows of the first part is lesser than or equal to the total output capacity of the output ports.

The incoming data stream may be identified as belonging to priority groups and the division of the data stream is then performed such that priority groups with a higher priority than a division threshold are sent to said internal queues in the first part, while groups with priority lower than said threshold are sent to the external memory in the second part.

BRIEF DESCRIPTION OF THE DRAWINGS

The invention will be described in detail below with reference to the accompanying drawings, in which.

DETAILED DESCRIPTION OF PREFERRED EMBODIMENTS

The general function of a switch is to forward data received on input links at a number of input ports to output links at output ports. The data is in form of packets and each packet has its own destination address corresponding to an output link.

Figure 1:
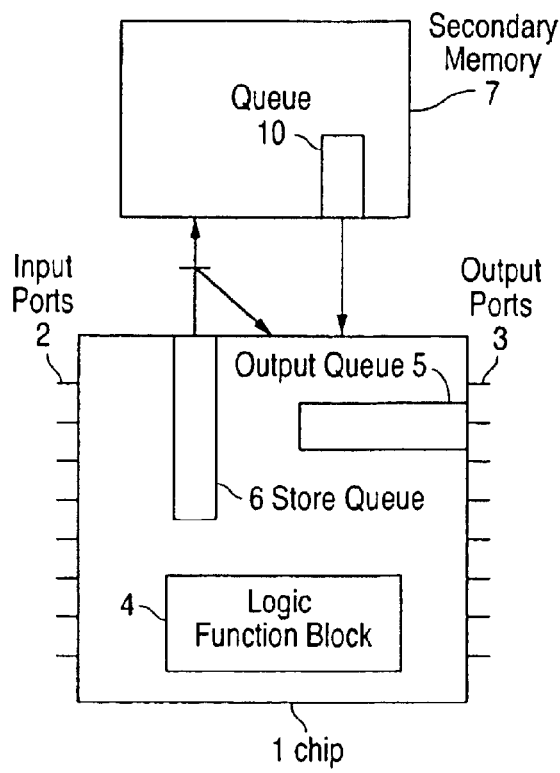
FIG. 1 is a block diagram of the memory structure according to the present invention.

In FIG. 1, the memory structure of a switch according to the present invention is shown.

The switch comprises a chip 1 having a primary memory for temporarily storing data packets received on the input ports 2 before they are sent on the output ports 3. The primary memory is generally a small and fast memory internal on the chip. A logic function block 4 on the chip detects address portions of the data packets so that the data packets are forwarded to the appropriate output port.

According to this embodiment of the invention, data packets are not stored at the input ports 2, but are stored at the output ports 3 in buffers or output queues 5 awaiting their turn to be sent on the output links. Each output port 3 may have a reserved memory area in the primary memory providing the respective output queue of which only one is shown in the figure.

The data rate of the output link connected to the output port may be lower than the data rate of the incoming data stream. There may be various reasons for this, e.g. if several input ports are sending packets to the same output port, collisions or pause messages to the output port. Thus, there is a risk for overflow in the respective output port. To prevent this, the chip 1 co-operates with a secondary memory 7. The secondary memory is generally an external memory having a large capacity. The external memory is also arranged in queues 10 for storing packets awaiting to be sent on the output links. The limited bandwidth makes it slower than the internal memory.

The chip 1 is also provided with a third memory temporarily storing data packets awaiting to be sent to the external memory 7 or to an output queue 5 as will be explained below. The third memory is generally a buffer or store queue 6 which may be a part of the internal primary memory.

A scheduler (not shown) is responsible for selecting packets from the internal queues 5 and the queues 10 of the external memory 7 to be sent on the output links. Each output port is provided with a separate scheduler on the chip but they all share the same bandwidth from the external memory. Various scheduler designs and methods of operation are known in the art. The scheduler as such does not form a part of the present invention.

Figure 2:
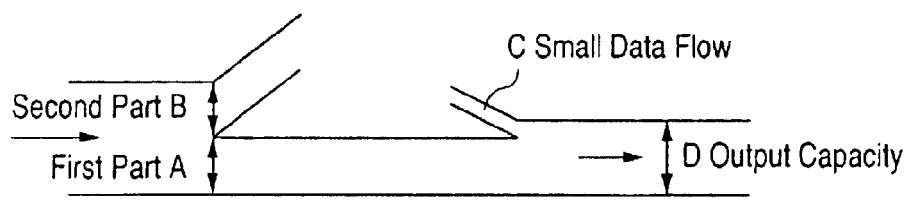
FIG. 2 is a schematic illustration of the data flow.

With reference to FIG. 2, the data flows belonging to one output port are shown. To the left there is an incoming data stream (A+B) which is larger than the output capacity D (e.g. 1 Gbit/s) of the output port. A basic concept of the invention is to divert only a part of the incoming data stream to the secondary (external) memory instead of the whole data stream when it becomes larger than the output capacity of the output port. Thus, it may be seen that a first part A of the data stream is sent to the internal queue of the primary memory and a second part B is sent to the external memory (via the store queue 6). The first part A may be selected a little smaller than the output capacity D of the output port, so that a small data flow C may be integrated back from the external memory to the internal queue for reasons that will be explained below. The division of the data stream results in that the capacity of the output port is always utilized to the largest possible extent. The output port will not be blocked by diverting the whole data stream to the external memory.

To divide the data stream, the switch must be able to separate the packets into identifiable flow groups. As is discussed below, the identification can be based on priority or some other non-priority (hash) value. Each output port has at least one queue. As every queue requires space, the number of queues should on the one hand be kept as low as possible. A possible implementation is one queue per priority group and output port, each queue containing a number of flow (hash) groups. The number of flow groups may be different in different queues. On the other hand, the greater number of queues, the finer granularity is achieved, i.e. it is possible to make a more accurate division of the data stream. Thus, it is also contemplated to provide more than one queue per priority group, each queue containing a part of the flow (hash) groups, or even one queue per priority value and hash value and output port.

Figure 3:
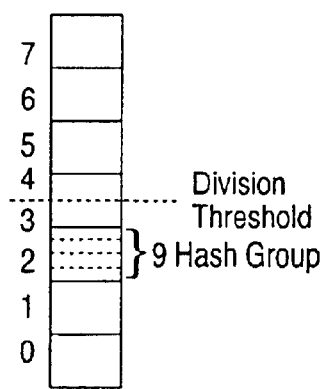
FIG. 3 is a schematic illustration of priority groups of the data stream.

Most often the data packets of the data stream do not have the same priority, 110 but some packets are to be served before others to experience lower delays in the switch. An example of priority groups is shown in FIG. 3. The illustrated system comprises eight priority groups, where group 0 is the highest priority. The division of the data stream may be performed so that the groups having the highest priority, e.g. groups 0 to 3, are put in the first part A to be sent to the internal queue while the groups 4 to 7 will be placed in second part B sent to the external memory. In this case, a division threshold is located between groups 3 and 4. As is mentioned above, it is possible to use any number of groups and to choose other priority systems.

Each priority group may also be divided into subgroups to achieve even finer granularity. The finer granularity, the more closely the part A to be sent directly to the internal queue may be adapted. In this example each priority group is divided into four so-called hash groups. The hash groups are formed by means of criteria other than priority. In a preferred embodiment of the invention, a hash group is formed by looking at a part of an arriving data packet and calculating a value based on that part, so that the packets will be evenly distributed in four groups, provided that the data parts are randomly distributed. Suitably, flow information is used that is constant during a session, e.g. an originating or destination address part of the data packet. This will result in that there is a logical continuity within the hash groups.

As is shown in FIG. 3, the priority groups are subdivided into hash groups 9 (shown only for group 2). Since all the hash groups within a priority group have the same priority, any one of the hash groups can be selected without breaking the priority order. This means that it is possible to select a hash group currently having the most suitable amount of traffic in view of the varying traffic loads among the hash groups.

The incoming traffic is sorted and directed to the appropriate output queue. In order to achieve a suitable division of the data stream, some sort of measure of the load on each queue is required. The simplest way is to calculate or set a fixed value for each output queue, e.g. an equal part of the total load. A better result is obtained if the load on each queue is actually measured.

Also, the capacity of the output ports is used as an input parameter. Sometimes it is sufficient to set the capacity to a fixed value approximately equal to the maximum capacity of the output links. However, e.g. due to packet collisions and received pause messages, the capacity is decreased. Then the capacity is measured as outlined below for better results.

As the incoming data stream fluctuates as to the amount of traffic (the load) in the various priority and hash groups, the division threshold will be moved up or down as the case may be. In other words, if the data rate in the top priority group decreases, the division threshold will be moved upwards (in FIG. 3) so that the traffic in the groups having lower priority also will be sent directly to the internal queue.

More in detail, the division of the data stream is performed as follows. The incoming data stream is identified or classified as belonging to the various priority and hash groups by the logic function block 4. Each group has a fixed or variable amount of traffic which is detected at the input ports. Also, the bandwidth or data rate of an output port is set at a fixed value or measured e.g. by counting the amount of transmitted data. Then the threshold is computed such that it is adapted to the bandwidth. The output ports are filled from the bottom with the highest priority groups and suitable hash groups. The division threshold is set between two priority groups or within a priority group between two hash groups.

The threshold should always be set lower than the bandwidth. This is for two reasons: the granularity is no less than the smallest group, i.e. a hash group; and the traffic load varies. If the threshold is computed as located inside a hash group, the threshold must still be set just under the hash group so as not to risk overflow. If the traffic load varies, the threshold cannot follow until the external memory is emptied, and the threshold may appear too low for a period.

The division threshold is set dynamically so that it may be adapted to the current traffic situation. With reference to FIG. 3, it may be moved downwards, i.e. more flow groups are sent through the external memory, or upwards when flows are integrated back to the internal flow. Switching more flows to the external memory is straightforward, since the order of the packets is not disturbed.

The idea with the external memory 7 is that the data after a time should be returned and integrated back into the flow and then sent to its respective address. (After a long time, some data may be discarded.) Thus, when it is detected that the data flow in the first part A of the incoming data stream is decreasing, i.e. the direct flow to the internal queue in the high priority and hash groups is decreasing or the capacity of the output port 3 is increasing, it is possible to send packets also from the external memory 7. Thus, when the traffic in part A is decreasing, the scheduler starts picking packets from the queues 10 to fill up the part C to complete the flow from the internal queues 5.

However, this means that a part of the flow takes a detour through the external memory 7. To avoid this, flows should be integrated back to the internal route as soon as possible.

When flows are integrated back, the respective queue of the external memory should be completely empty before the flow is switched to the internal queue. When the integration process is started, a blocking of the flow in the relevant group to the external memory is set up in the third memory (store queue 6), and the queue 10 of the external memory is emptied. When this is done, the contents of the third memory is moved to the internal queue of the primary memory and the flow is switched to part A, that is directly to the internal queue 3. Preferably, the integration process should only start if the lengths of the respective queues of the external 10 and third memory 6 are smaller than predetermined values. Also, the integration process should be interrupted if the length of the queue 10 of the external memory rises above a certain value. Then, the blocking in the third memory 6 is released and the flow sent on to the external memory 7 as before the integration process started.

The number of queues in the external memory is kept as low as possible, and it is preferred to arrange one queue for each priority group. Thus, the external memory does not distinguish between hash groups with the same priority but they fall in the same queue. When the queue is emptied, this means that a whole priority group is emptied from the external memory.

Assume for instance that it is detected that the division threshold may be moved one step so that a further priority group (or hash group if the external memory has separate queues for the hash groups) having lower priority may be included in the data stream flowing directly to the internal queue. In this example, the threshold is placed between groups 4 and 5. However, before group 4 is switched to the internal queue, the data packets in group 4 previously stored in the external memory 7 should be sent from the external memory. If the external memory 7 is emptied of all the data packets belonging to group 4 before the priority group 4 is switched this means that the order of the data packets is preserved. Thus, the priority group 4 in question is not switched immediately to the internal queue. The incoming packets in priority group 4 continue to be temporarily stored in the store queue 6, but they are not sent on to the external memory 7. First, the external memory 7 is emptied of data packets belonging to priority group 4. When the external memory 7 is empty in this group, the contents of the store queue 6 is sent to the internal queue. Then, the incoming data stream in priority group 4 is switched to be sent directly to the internal queue.

If the division threshold is to be moved in the other direction, i.e. the traffic in top priority and hash groups is increased, a low priority hash group is simply switched to the external memory. In this case, the order of data packets is not disturbed. Thus, the threshold may even be placed within a priority group between hash groups.

Irrespective of where the division threshold is located, the schedulers at the output ports generally select packets in some controlled order from the internal queues 5 and the external queues 10. As the data flow running through the external memory most often has the lower priority, the scheduler first selects packets from the internal queue. If the internal queue is empty, it looks at the external memory. However, since the division between the parts flowing directly to the internal queues and via the external memory is not fixed, it may be that some packets flowing through the external memory have a higher priority than the next packet to be sent from the internal queue. Thus, it may be advantageous if the scheduler selects packets on a strict priority basis. If packets have the same priority, packets from the internal queue are selected first.

As the various schedulers of the output ports share the same bandwidth from the external memory, the whole bandwidth may be occupied by the other ports, as seen from one output port. Then, as a further feature, the respective scheduler is able to read from the internal queue, even though the priority order may be broken.

As may be seen, the invention provides several advantages. The lowest latency possible is always guaranteed in the highest priority group. There is no complete blocking when the incoming data stream exceeds the capacity of an output port. The amount of data sent through the external memory is kept as small as possible. The order of data packets is preserved within each session when returning data from the external memory.

A specific embodiment of the invention has been shown. A person skilled in the art will appreciate that the numbers of ports, priority and hash groups etc may be varied without departing from the scope of the invention which is defined by the following claims.

What is claimed is:

1. A method of managing packet queues in a switch having a limited primary memory including a number of queues for switching data packets between input ports and output ports, and connected to a larger secondary memory also including a number of queues, comprising the steps of:
dividing a data stream incoming on the input ports intended for respective output ports into two parts, of which the first part contain flows to be sent to an output port queue of the primary memory and the second part contain flows to be sent to the secondary memory;
wherein the data of the incoming data stream is identified as belonging to flow groups, each flow group containing a number of flows; and
wherein a number of flow groups are assigned to each queue of the primary memory and the secondary memory.

2. The method according to claim 1, wherein the data of the second part is stored in a third memory before it is sent to the secondary memory.

3. The method according to claim 2, wherein the primary memory is a fast memory internal on a chip and the secondary memory is external from the chip.

4. The method according to claim 3, wherein the third memory is provided as store queues forming part of the primary memory.

5. The method according to claim 1, wherein each flow group contains traffic with a specific load value, and the division of the data stream is performed such that a number of flow groups are selected to be sent to said queues of the primary memory in the first part, and the other flow groups are sent to the secondary memory in the second part, the selection being based on the load value, in order to adapt the first part of the data stream to the current capacity of the output port.

6. The method according to claim 5, wherein the load value for each flow group is set to a fixed value.

7. The method according to claim 5, wherein the load value is set by measuring the amount of traffic in the flow groups.

8. The method according to claim 1, wherein each data packet of the incoming data stream is assigned a hash value based on constant flow information and the flow groups are formed by means of the hash value.

9. The method according to claim 8, wherein the division of the data stream is performed such that a number of flow groups are selected to be sent to said queues of the primary memory in the first part, and the other flow groups are sent to the secondary memory in the second part in order to adapt the first part of the data stream to the current capacity of the output port.

10. The method according to claim 1, wherein the data packets of the incoming data stream have a priority value and are identified as belonging to priority groups and the flow groups are formed by means of the priority.

11. The method according to claim 1, wherein the data packets of the incoming data stream have a priority value and are assigned a hash value and the flow groups are formed by means of the priority value and the hash value, each flow group having a certain combination of priority value and hash value.

12. The method according to claims 10 or 11, wherein a number of queues contain flow groups having the same priority value.

13. The method according to claim 10 or 11, wherein the division of the data stream is performed such that priority groups having a priority above a division threshold are sent to said queues of the primary memory in the first part, while priority groups having a priority below said threshold are sent to the secondary memory in the second part.

14. The method according to claim 1, wherein the division of the data stream is performed, so that the total load of the flows of the first part is lesser than or equal to the total output capacity of the output ports.

15. The method according to claim 14, wherein the total output capacity of the output ports is set to a fixed value.

16. The method according to claim 14, wherein the total output capacity of the output ports is set by measuring the traffic passing the output ports.

17. The method according to claim 1, wherein a scheduler selects packets from the primary memory and the secondary memory.

18. The method according to claim 17, wherein the scheduler first selects packets from the primary memory, then, if the primary memory is empty, the scheduler selects packets from the secondary memory.

19. The method according to claim 17, wherein the data packets have a priority value, and the scheduler selects packets on a strict priority basis from the primary memory and the secondary memory, and if packets have the same priority, packets from the primary memory are selected first.

20. The method according to claim 19, wherein the output ports share the same bandwidth from the secondary memory, and, when the whole bandwidth is occupied by the other output ports, as seen from one output port, then, the scheduler is able to read from the primary memory, even though the priority order may be broken.

21. The method according to claim 2, wherein flows are integrated back from the secondary memory to the primary memory, by means of the following steps: the flow in the relevant group to the secondary memory is blocked and stored in the third memory, and the queue of the secondary memory is emptied; when this is done, the contents of the third memory is moved to the internal queue of the primary memory and the relevant flow is switched to the first part.

22. The method according to claim 21, wherein the integration process only starts if the lengths of the respective queues of the secondary memory and the third memory are smaller than predetermined values.

23. The method according to claim 21, wherein the integration process is interrupted, if the length of the respective queue of the secondary memory rises above a certain value by releasing the blocking in the third memory and sending on the flow to the secondary memory.

24. The method according to claim 1, wherein at least one flow in the first part is moved to the second part, if the load of the flows currently located in the first part of the incoming data stream exceeds the capacity of the output ports.

25. An arrangement for managing packet queues in a switch having a limited primary memory including a number of queues for switching data packets between input ports and output ports, and connected to a larger secondary memory also including a number of queues, comprising:
  means for dividing a data stream incoming on the input ports intended for respective output ports into two parts, of which the first part contain flows to be sent to an output port queue of the primary memory and the second part contain flows to be sent to the secondary memory;
  wherein the data of the incoming data stream is identified as belonging to flow groups, each flow group containing a number of flows; and
  wherein a number of flow groups are assigned to each queue of the primary memory and the secondary memory.

26. The arrangement according to claim 25, wherein the data of the second part is stored in a third memory before it is sent to the secondary memory.

27. The arrangement according to claim 26, wherein the primary memory is a fast memory internal on a chip and the secondary memory is external from the chip.

28. The arrangement according to claim 27, wherein the third memory is provided as store queues forming part of the primary memory.

29. The arrangement according to claim 25, wherein each flow group contains traffic with a specific load value, and the division of the data stream is performed such that a number of flow groups are selected to be sent to said queues of the primary memory in the first part, and the other flow groups are sent to the secondary memory in the second part, the selection being based on the load value, in order to adapt the first part of the data stream to the current capacity of the output port.

30. The arrangement according to claim 29, wherein the load value for each flow group is set to a fixed value.

31. The arrangement according to claim 29, wherein the load value is set by measuring the amount of traffic in the flow groups.

32. The arrangement according to claim 25, wherein each data packet of the incoming data stream is assigned a hash value based on constant flow information and the flow groups are formed by means of the hash value.

33. The arrangement according to claim 32, wherein the division of the data stream is performed such that a number of flow groups are selected to be sent to said queues of the primary memory in the first part, and the other flow groups are sent to the secondary memory in the second part in order to adapt the first part of the data stream to the current capacity of the output port.

34. The arrangement according to claim 25, wherein the data packets of the incoming data stream have a priority value and are identified as belonging to priority groups and the flow groups are formed by means of the priority.

35. The arrangement according to claim 25, wherein the data packets of the incoming data stream have a priority value and are assigned a hash value and the flow groups are formed by means of the priority value and the hash value, each flow group having a certain combination of priority value and hash value.

36. The arrangement according to claim 34 or 35 wherein a number of queues contain flow groups having the same priority value.

37. The arrangement according to claim 34 or 35, wherein the division of the data stream is performed such that priority groups having a priority above a division threshold are sent to said queues of the primary memory in the first part, while priority groups having a priority below said threshold are sent to the secondary memory in the second part.

38. The arrangement according to claim 25, wherein the division of the data stream is performed, so that the total load of the flows of the first part is lesser than or equal to the total output capacity of the output ports.

39. The arrangement according to claim 38, wherein the total output capacity of the output ports is set to a fixed value.

40. The arrangement according to claim 38, wherein the total output capacity of the output ports is set by measuring the traffic passing the output ports.

41. The arrangement according to claim 25, wherein a scheduler selects packets from the primary memory and the secondary memory.

42. The arrangement according to claim 41, wherein the scheduler first selects packets from the primary memory, then, if the primary memory is empty, the scheduler selects packets from the secondary memory.

43. The arrangement according to claim 41, wherein the data packets have a priority value, and the scheduler selects packets on a strict priority basis from the primary memory and the secondary memory, and if packets have the same priority, packets from the primary memory are selected first.

44. The arrangement according to claim 43, wherein the output ports share the same bandwidth from the secondary memory, and, when the whole bandwidth is occupied by the other output ports, as seen from one output port, then, the scheduler is able to read from the primary memory, even though the priority order may be broken.

45. The arrangement according to claim 26, wherein flows are integrated back from the secondary memory to the primary memory, by means of the following steps: the flow in the relevant group to the secondary memory is blocked and stored in the third memory, and the queue of the secondary memory is emptied; when this is done, the contents of the third memory is moved to the internal queue of the primary memory and the relevant flow is switched to the first part.

46. The arrangement according to claim 45, wherein the integration process only starts if the lengths of the respective queues of the secondary memory and the third memory are smaller than predetermined values.

47. The arrangement according to claim 45, wherein the integration process is interrupted, if the length of the respective queue of the secondary memory rises above a certain value by releasing the blocking in the third memory and sending on the flow to the secondary memory.

48. The arrangement according to claim 25, wherein at least one flow in the first part is moved to the second part, if the load of the flows currently located in the first part of the incoming data stream exceeds the capacity of the output ports.

\* \* \* \* \*